US012518486B1

(12) United States Patent
Bang

(10) Patent No.: US 12,518,486 B1
(45) Date of Patent: Jan. 6, 2026

(54) SYSTEMS FOR GENERATING ANNOTATED THREE-DIMENSIONAL MODELS FOR OUTPUT BASED ON AN INPUT IMAGE

(71) Applicant: AMAZON TECHNOLOGIES, INC., Seattle, WA (US)

(72) Inventor: Seungbae Bang, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 218 days.

(21) Appl. No.: 18/467,622

(22) Filed: Sep. 14, 2023

(51) Int. Cl.
*G06T 17/20* (2006.01)
*G06T 7/60* (2017.01)
*G06V 10/24* (2022.01)
*G06V 10/26* (2022.01)

(52) U.S. Cl.
CPC ............... *G06T 17/20* (2013.01); *G06T 7/60* (2013.01); *G06V 10/24* (2022.01); *G06V 10/26* (2022.01); *G06T 2207/20044* (2013.01)

(58) Field of Classification Search
None
See application file for complete search history.

(56) References Cited

U.S. PATENT DOCUMENTS

| | | | | |
|---|---|---|---|---|
| 12,307,587 | B2 * | 5/2025 | Tran | A61B 5/1112 |
| 2021/0082179 | A1 * | 3/2021 | Fedyukov | G06T 7/60 |
| 2021/0142561 | A1 * | 5/2021 | Aigerman | G06T 15/04 |
| 2021/0335038 | A1 * | 10/2021 | Zhang | G06T 17/205 |
| 2024/0169576 | A1 * | 5/2024 | Aydermir | G06Q 50/04 |

OTHER PUBLICATIONS

Aldrich, et al., "Collision-driven Volumetric Deformation on the GPU", Walt Disney Animation Studios/University of California, 2011, 4 pgs. Retrieved from the Internet: URL: https://citeseerx.ist.psu.edu/document?repid=rep1&type=pdf&doi=c8e1cc56bf3bf1cc342fb5739315a3cbaa091e15.
Amberg, et al., "Optimal Step Nonrigid ICP Algorithms for Surface Registration", The University of Basel, 2007, 8 pgs. Retrieved from the Internet: URL: http://vigir.missouri.edu/~gdesouza/Research/Conference_CDs/IEEE_CVPR_2007/data/papers/0197.pdf.
Arun, et al., "Least-squares Fitting of Two 3-d Point Sets", 1987, 3 pgs. Retrieved from the Internet: URL: https://www.math.pku.edu.cn/teachers/yaoy/Fall2011/arun.pdf.

(Continued)

*Primary Examiner* — Edward Martello
(74) *Attorney, Agent, or Firm* — Lindauer Law, PLLC

(57) ABSTRACT

The shape of an article of footwear is initially represented by first mesh data. Second mesh data having fewer faces is determined by using an occlusion algorithm to determine occluded faces of the first mesh, using a first function to determine values based on the non-occluded faces, and a second function to determine values based on occluded and non-occluded faces. Using these values, the second mesh is spaced a minimum offset distance to enclose the first mesh without intersection. Proxy data representing the shape of a foot is aligned with the inner surface of the second mesh, then deformed to place the shape adjacent to the inner surface. The mesh representing the footwear may be deformed to place portions of the representation of footwear adjacent to the shape of the foot. Locations of keypoints in the shape of the foot are used to add keypoints to the mesh.

20 Claims, 7 Drawing Sheets

(56) References Cited

OTHER PUBLICATIONS

Ben-Chen, et al., "Spatial Deformation Transfer", Aug. 2009, 9 pgs. Retrieved from the Internet: URL: https://www.researchgate.net/publication/220789205_Spatial_Deformation_Transfer.

Bridson, et al., "Robust Treatment of Collisions, Contact and Friction for Cloth Animation", 2002, 10 pgs. Retrieved from the Internet: URL: https://graphics.stanford.edu/papers/cloth-sig02/cloth.pdf.

Fang, et al., "Guaranteed Globally Injective 3d Deformation Processing", Aug. 2021, 13 pgs. Retrieved from the Internet: URL: https://dl.acm.org/doi/pdf/10.1145/3450626.3459757.

Sadrehaghighi, et al., "Tetgen, a Delaunay-based Quality Tetrahedral Mesh Generator.", ACM Transactions on Mathematical Software, Jul. 2022, 58 pgs. Retrieved from the Internet: URL: https://www.researchgate.net/profile/Ideen-Sadrehaghighi/publication/358635395_Tetgen_-_A_Delaunay-Based_Quality_Tetrahedral_Mesh_Generator/ links/6229bca597401151d20b6ad4/Tetgen-A-Delaunay-Based-Quality-Tetrahedral-Mesh-Generator.pdf.

Harmon, et al., "Interference-aware Geometric Modeling", 10 pgs. Retrieved from the Internet: URL: https://citeseerx.ist.psu.edu/document?repid=rep1&type=pdf&doi=41b3458c4f3288321c329f5f56989520b0d7e587.

Hu, et al., "Fast Tetrahedral Meshing in the Wild", Jan. 24, 2020, 17 pgs. Retrieved from the Internet: URL: https://arxiv.org/pdf/1908.03581.pdf.

Hu, et al., "Tetrahedral Meshing in the Wild.", Aug. 2018, 14 pgs. Retrieved from the Internet: URL: https://dl.acm.org/doi/pdf/10.1145/3197517.3201353.

Jacobson, et al., "Bounded Biharmonic Weights for Real-Time Deformation", Jul. 2011, 8 pgs. Retrieved from the Internet: URL: https://homes.cs.washington.edu/~jovan/papers/jacobson-2011-bbw.pdf.

Jacobson, et al., "Matlab Toolbox for Geometry Processing", downloaded Aug. 23, 2023, 5 pgs. Retrieved from the Internet: URL: https://github.com/alecjacobson/gptoolbox.

Jacobson, et al., "libigl: A simple C++ geometry processing library", 2019, 10 pgs. Retrieved from the Internet: URL: https://libigl.github.io/.

Jacobson, et al., "Robust inside-outside Segmentation Using Generalized Winding Numbers", 2013, 4 pgs. Retrieved from the Internet: URL: https://users.cs.utah.edu/~ladislav/jacobson13robust/jacobson13robust.html.

Ju, et al., "Mean Value Coordinates for Closed Triangular Meshes", Rice University 2005, 6 pgs. Retrieved from the Internet: URL: https://www.cse.wustl.edu/~taoju/research/meanvalue.pdf.

Miller, G., "Efficient Algorithms for Local and Global Accessibility Shading", Apple Computer, Inc., 1994, 8 pgs. Retrieved from the Internet: URL: https://dl.acm.org/doi/pdf/10.1145/192161.192244.

Rajon, et al., "Marching cube algorithm: review and trilinear interpolation adaptation for image-based dosimetric models", Sep.-Oct. 2003, 11 pgs. Retrieved from the Internet: URL: https://www.sciencedirect.com/science/article/abs/pii/S0895611103000326.

Sacht, et al., "Nested cages. ACM Transactions on Graphics (TOG)", 2015, 6 pgs. Retrieved from the Internet: URL: https://dl.acm.org/doi/10.1145/2816795.2818093.

Sorkine, et al., "As-Rigid-As-Possible Surface Modeling", TU Berlin, Germany, 2007, 8 pgs. Retrieved from the Internet: URL: https://igl.ethz.ch/projects/ARAP/arap_web.pdf.

Von Funck, et al., "Vector Field Based Shape Deformations", MPI Informatik, 2006, 8 pgs. Retrieved from the Internet: URL: http://graphics.stanford.edu/courses/cs468-07-winter/Papers/fts-vfbsd-06.pdf.

Xu, et al., "Signed Distance Fields for Polygon Soup Meshes.", The University of Southern California, 2020, 7 pgs. Retrieved from the Internet: URL: https://dl.acm.org/doi/pdf/10.5555/2619648.2619655#:~:text=Distance%20fields%20can%20be%20signed,watertight%20mesh%20with%20manifold%20geometry.

Ye, et al., "A Unified Cloth Untangling Framework Through Discrete Collision Detection", 2017, 12 pgs. Retrieved from the Internet: URL: https://www.researchgate.net/publication/320378074_A_Unified_Cloth_Untangling_Framework_Through_Discrete_Collision_Detection.

* cited by examiner

ACCESS SECOND MESH DATA REPRESENTING THE SHAPE OF AN ARTICLE OF FOOTWEAR AND PROXY DATA REPRESENTING THE SHAPE OF A FOOT
402

ALIGN AND SCALE THE SOLE PORTION OF THE SHAPE OF THE FOOT WITH THE INNER SOLE REGION OF THE SHAPE OF THE ARTICLE OF FOOTWEAR
404

TO FIG. 4B

SYSTEMS FOR GENERATING ANNOTATED THREE-DIMENSIONAL MODELS FOR OUTPUT BASED ON AN INPUT IMAGE

BACKGROUND

Online stores, and other types of interfaces, may enable users to examine items using an augmented reality (AR) or virtual-try-on (VTO) process, in which an output is presented that depicts an item at least partially superimposed over an image of a part of a user's body, to create the appearance of the user wearing the item. Determining a correct orientation and alignment of the item relative to the user's body typically requires manual or machine-learned processes to annotate locations in the geometry of the item and may be subject to inaccuracy, resulting in misalignment of images and other negative user experiences.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
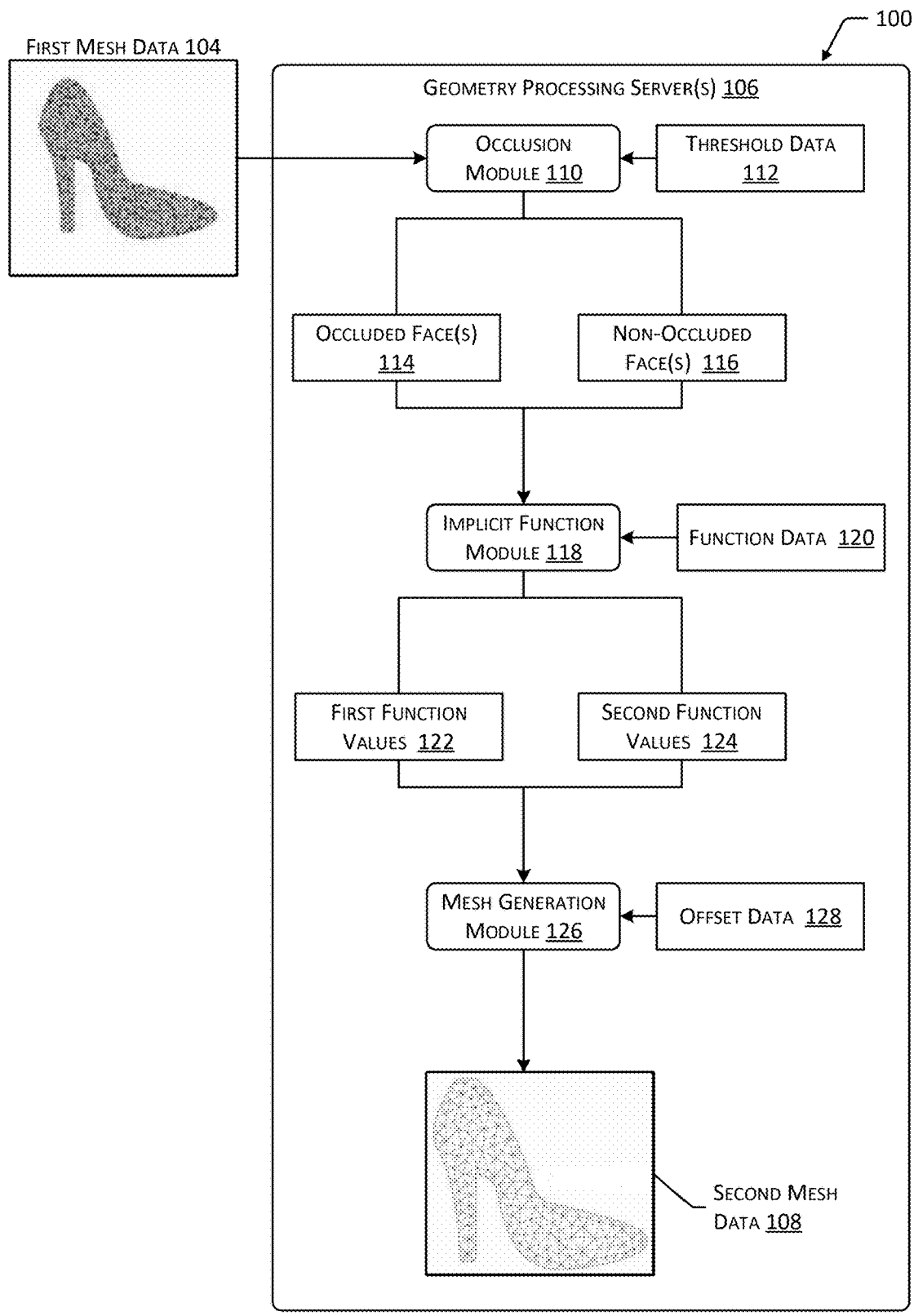
FIGS. 1A and 1B are a diagram depicting an implementation of a system for determining a geometric mesh representing the shape of an object and associating location data, such as keypoints, with the mesh.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to coverall modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Online stores and other entities may offer items for purchase, lease, subscription, and so forth. Webpages or other interfaces associated with an entity may present information regarding various items, such as text descriptions, images, and so forth. In some cases, an entity may offer augmented reality (AR) or virtual-try-on (VTO) functionality, in which a user may provide an image of a portion of the user's body. The image provided by the user and one or more images or three-dimensional (3D) models of the item may be used to generate an output image that shows the item in association with the individual, such as by depicting the individual wearing the item. For example, a user examining a pair of shoes may acquire an image of the user's foot and leg, such as by holding a camera above the foot while standing or sitting. In such a case, an image that depicts the top surface of a shoe superimposed over the image of the foot may be generated to provide the appearance that the shoe is being worn by the user. To properly align, orient, and scale the image of the shoe relative to the image of the user's body, the geometric model of the shoe is associated with location data, such as keypoints, that each correspond to a specific portion of the user's foot. The image of the shoe is aligned, oriented, and scaled by positioning each keypoint proximate to the corresponding portion of the foot. Additionally, negative proxy geometries representing the position of human feet and legs when wearing a shoe are used to properly composite the rendering of the shoe geometry in the output image, such as by removing portions of the shoe geometry that would typically be occluded by the user's body.

The process of annotating the geometry of a shoe or other object with keypoints and the generation of negative proxy geometries is typically performed manually by an artist, through many iterations, which may require significant time and cost, especially when a large number of objects are annotated in this way. Manual placement of keypoints may also be subject to inaccuracy. Other techniques include use of machine learning systems, which require pretraining, processing large data sets, may utilize specialized processors, and incur significant time and computational costs.

Described in this disclosure are techniques for automatically determining location data, such as keypoints, associated with a model representing the geometric shape of a first object, that may also deform or otherwise change the shape of the representation of the first object to represent the shape of the object when it is positioned relative to a second object. For example, mesh data representing the geometric shape of an article of footwear may be deformed based on proxy data representing the geometric shape of a human foot to represent the shape of the footwear when worn. The shape of the representation of the foot may be deformed to conform to the representation of the article of footwear, such as by providing the foot with a shape that would position the sole of the foot adjacent to the inner sole of the footwear. The shape of the mesh data representing the footwear may then be deformed to conform to the shape of the foot, such as by providing the mesh data with a shape that would position an upper surface of the footwear against the upper surface of the foot. The locations of keypoints or other location data in the proxy data representing the foot may be used to associate keypoints or other location data with adjacent locations in mesh data representing the footwear. The techniques described herein may determine location data associated with a representation of a first object, and in some implementations a deformed shape of the representation of the first object relative to a representation of a second object, using geometric determinations, without requiring manual input, machine learning systems, pretraining, large data sets, or computations using specialized hardware. While example implementations included in this disclosure describe determining location data associated with a representation of an article of footwear and deforming the shape of the representation of the footwear relative to a representation of the shape of a foot, the techniques described herein may be used in conjunction with any object, including other clothing objects, or other types of objects that may be positioned relative to one another.

Initially, the geometric shape of a first object, such as an article of footwear, may be represented by first mesh data. For example, the first mesh data may include a polygon mesh, such as a triangle mesh having a plurality of vertices, edges, and triangular faces. The first mesh data may be received from an entity associated with the footwear or other object, determined by scanning the footwear or other object, and so forth. Therefore, the first mesh data may not necessarily represent the complete geometry of the object. For example, some types of footwear may have interior surfaces that are occluded from view and may not be determined by scanning the object. Additionally, the first mesh data may include a large number of faces which may cause computations associated with the first mesh data to incur significant time and computational cost.

Second mesh data may be generated based on the first mesh data, the second mesh data including a smaller count of faces (e.g., a coarser mesh), that may have the same or different polygonal shapes as the first mesh data. For example, the second mesh data may include a tetrahedron mesh. The second mesh data may include a watertight mesh that encloses the shape represented by the first mesh data without intersecting the shape. To generate the second mesh data, an implicit function may be determined based on the first mesh data. The implicit function may include a signed distance function, an unsigned distance function, a winding number function, or other types of functions that may be used to determine values that indicate portions of the first mesh data that represent an outer surface of the object. However, the first mesh data may include one or more redundant faces, especially within the portion of the first mesh data that represents the interior of the object, which may cause winding number values and other functions to result in unstable or inaccurate determinations. To improve the accuracy of the implicit function, an ambient occlusion algorithm may be used to determine one or more faces of the first mesh that that are occluded. For example, an ambient occlusion value may determine ambient occlusion values for at least a subset of the faces of the first mesh data, and each face having a value greater than a threshold value indicative of occlusion (such as a value of 1 indicating a fully-occluded face) may be deleted or disregarded. After determining and disregarding one or more occluded faces, a winding number function, or another function, may then be used to determine values indicative of portions of the first mesh data that represent an outer surface of the object with improved accuracy. In some implementations, the non-occluded faces of the first mesh data may be used, in conjunction with a winding number function, to determine a first set of values (e.g., winding number values), while both occluded and non-occluded faces may be used in conjunction with an unsigned distance function to determine a second set of values (e.g., unsigned distance values). The first and second sets of values may be used to determine signed distance values for the faces, which may then be used to generate second mesh data.

Based on the values determined using the implicit function(s), the second mesh data may be generated at a minimum offset distance from the outer surface represented by the first mesh data. The minimum offset distance may be a distance at which the second mesh data encloses the shape represented by the first mesh data and does not intersect the shape. In some implementations, the offset distance may be determined iteratively. For example, second mesh data may be generated at a first distance from the outer surface, and if the shape represented by the second mesh data does not intersect the shape represented by the first mesh data, the second mesh data may be generated at a second distance from the outer surface that is smaller than the first distance. If an offset distance that causes the shape represented by the second mesh data to intersect the shape represented by the first mesh data is determined, the second mesh data may be generated using a larger offset distance.

After the second mesh data has been generated, proxy data that represents the shape of a second object may be used to determine a modified (e.g., deformed) shape of the first object represented by the second mesh data. For example, the proxy data may represent the shape of a human foot, while the second mesh data represents the shape of a shoe. To determine shapes for the representations of the objects that simulate the shoe being worn by the foot, the portion of the proxy data representing the sole of the foot may be aligned with the portion of the second mesh data representing the inner sole of the shoe. The proxy data representing the foot may then be deformed, such as by determining a shape of a portion of the proxy data representing the sole of the foot that conforms to the portion of the second mesh data representing the inner sole of the shoe and would position the sole of the foot adjacent to the inner sole of the shoe. In some implementations, one or more portions of the second mesh data may then be deformed to provide the shoe represented by the second mesh data with a shape that accounts for the deformed shape of the representation of the foot. For example, the representation of the tongue of a sneaker or the upper surface of a different type of footwear may be deformed to conform to the shape of the representation of the top of the foot or the ankle adjacent to the foot. After determining the deformed shape of the second mesh data, the first mesh data may be deformed in a corresponding manner such that the shape of the first mesh data represents the shape of an article of footwear that conforms to the shape of a foot.

The proxy data may include location data, such as keypoints, that represent selected locations in the representation of the foot, such as the heel, ankle, arch, balls of the foot, and so forth. After deforming the shape of the foot represented by the proxy data, the locations of the keypoints of the proxy data may be used to determine locations for keypoints in the first mesh data that represents the footwear, such as by placing keypoints in the footwear adjacent to those in the proxy data.

Portions of the second mesh data that represent the inner surface of the first object may be determined differently based on the characteristics of the object. For example, if the first object is a closed style of shoe, such as a sneaker, a large portion of the inner surface may not typically be visible. In such a case, an ambient occlusion algorithm may be used to determine one or more faces of the first mesh that that are non-occluded. For example, an ambient occlusion value may determine ambient occlusion values for a least a subset of the faces of the second mesh data, and each face having a value less than a threshold value indicative of occlusion (such as a face having a value of 0 indicating a non-occluded face) may be determined to represent the outer surface of the object. Portions of the second mesh data that represent the inner surface may be generated at a selected offset distance from the portion that is determined to represent the outer surface. In some implementations, the offset distance may be selected based on one or more characteristics of the object. For example, an offset distance may be selected based on a height, width, thickness, or type of footwear, such as a larger offset distance for a tall boot and a smaller offset distance for a short sneaker.

As another example, for an open style of shoe, such as a sandal, a larger portion of the inner sole or other portions of the inner surface may be visible. Portions of the second mesh data that represent the inner surface may be determined by aligning the proxy data representing the foot with the inner sole region of the second mesh data. Once the shape of the foot has been aligned with the representation of the sole region of the shoe, the portions of the second mesh data that represent the inner surface of the shoe may be inferred to be the portions adjacent to the position of the foot. For example, the second mesh data may be generated or deformed conform the shape of the portions of the mesh to the representation of the foot such that the shape of the portions of the mesh would position the represented object as close as possible to the shape represented by the proxy data without intersecting it.

Implementations described herein may therefore enable location data, such as keypoints, to be associated with mesh data representing an article of footwear or other type of object using primarily the geometry associated with the object, without requiring manual input from an artist or other user, and without requiring use of machine learning techniques or computations using specialized hardware. Additionally, implementations described herein may enable a deformed shape of footwear or another object, that simulates wear or other uses, to be determined. Subsequently, the mesh data that represents the object, the determined location data, and the determined shape may be used as output. For example, a user may provide an image of a foot, and the output may include an image of a shoe being worn by the foot, the image of the shoe having the determined shape and being oriented to the depicted foot using the location data, resulting in an accurate and realistic alignment and position of the footwear.

Figure 1B:
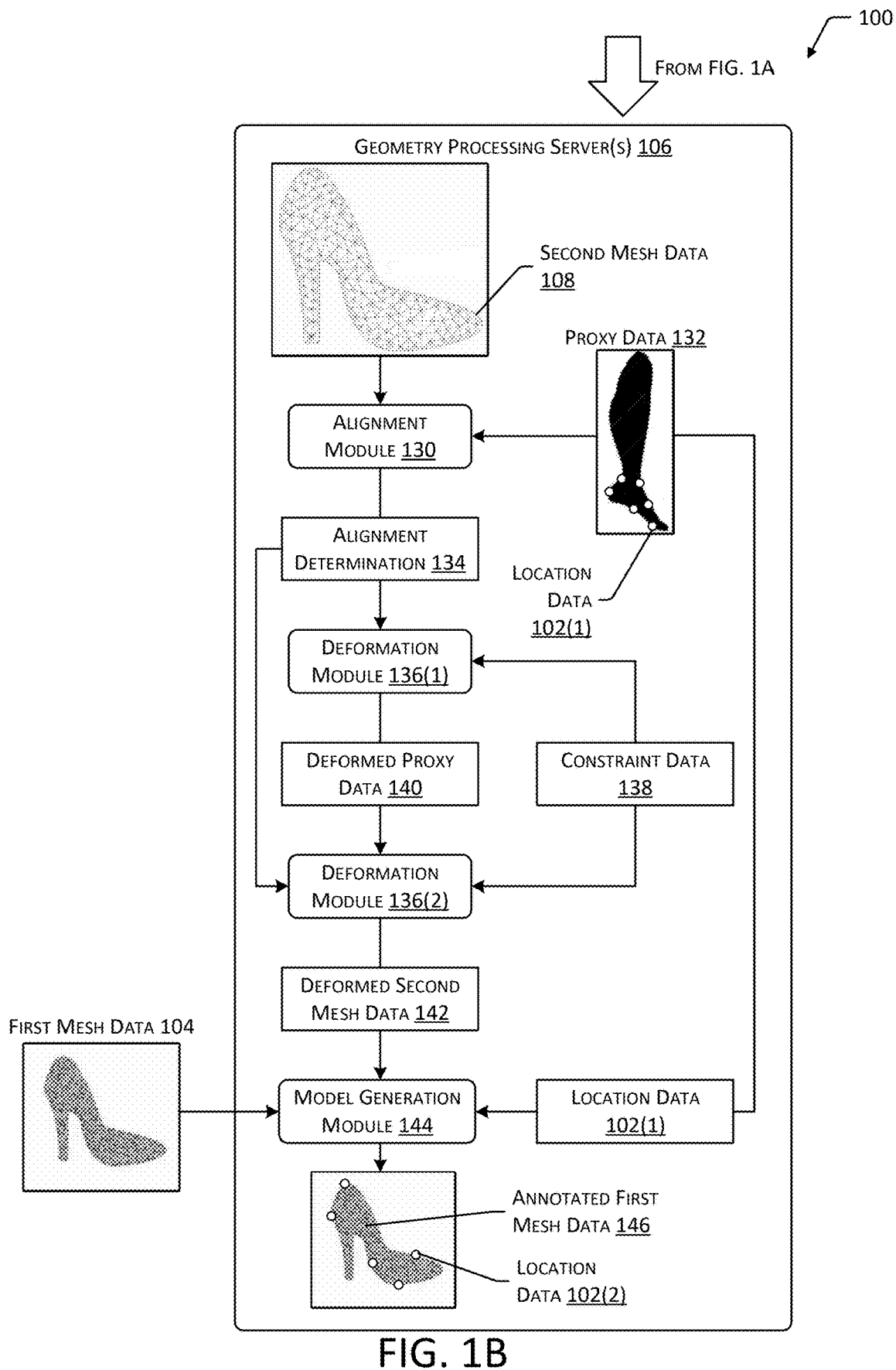

FIGS. 1A and 1B are a diagram depicting an implementation of a system 100 for determining a geometric mesh representing the shape of an object and associating location data, such as keypoints, with the mesh. In the implementation shown in FIGS. 1A and 1B, the object represented by first mesh data 104 includes an article of footwear; however, the functions described with regard to FIGS. 1A and 1B may be used to determine location data 102 associated with any type of object. The first mesh data 104 may be provided as an input to one or more geometry processing servers 106. While FIGS. 1A and 1B depict one or more geometry processing server(s) 106, any number and any type of computing device(s) may be used to perform the functions described herein, including, without limitation, personal computing devices, portable computing devices, networked media devices, wearable devices, vehicle-based devices, servers, and so forth. In some cases, the first mesh data 104 may be associated with an item available for purchase using an online store. For example, the first mesh data 104 may be provided by a seller or manufacturer of the item, or may be generated by scanning images or models of the item. In such a case, the first mesh data 104 may be incomplete, such as by omitting inner surfaces of the object that are not visible, which in some cases may include portions of the interior of the depicted footwear. Additionally, in some cases, the first mesh data 104 may include a large number of faces that may cause alignment, orientation, and deformation processes performed using the first mesh data 104 to incur a large computational cost. For example, the first mesh data 104 may include a triangle mesh having a high resolution (e.g., a large number of faces). In some implementations, the first mesh data 104 may include data indicative of other characteristics of the represented object, such as texture data.

As described previously, the first mesh data 104 may be processed to determine second mesh data 108 having a smaller number of faces and that represents a sufficient portion of the geometric shape of the object to enable alignment, orientation, and deformation of the shape of the object relative to a representation of another object, such as deforming the representation of the depicted footwear relative to a representation of a human foot. An occlusion module 110 associated with the geometry processing server(s) 106 may determine ambient occlusion values for at least a portion of the faces included in the first mesh data 104. An ambient occlusion value for a particular face may represent an amount by which the face is occluded (e.g., blocked from view by one or more other faces). For example, an ambient occlusion value of 1 may indicate a face that is fully occluded, while an ambient occlusion value of 0 may indicate a face that is fully non-occluded. In other implementations, other qualitative of quantitative values or ranges of values may be used to indicate occlusion or non-occlusion of one or more faces of the first mesh data 104. Ambient occlusion values may be used to facilitate determination of portions of the first mesh data 104 that represent the inner and outer surfaces of the object. In some implementations, the occlusion module 110 may access threshold data 112, which may represent one or more values indicative of occlusion, non-occlusion, or partial occlusion of faces. For example, based on a relationship between the ambient occlusion values for the first mesh data 104 and one or more threshold values, the occlusion module 110 may determine a first portion of the faces that represent occluded faces 114, and a second portion of the faces that represent non-occluded faces 116. In some cases, at least a portion of the occluded faces 114 may include inaccurate or redundant faces that do not correspond to a physical surface of the represented object. As such, disregarding the occluded faces 114 for one or more functions may improve the accuracy of values determined using the functions.

For example, the presence of redundant faces in the first mesh data 104, may cause determination of winding number values and other functions to result in unstable or inaccurate determinations. Use of the occlusion module 110 to determine the occluded faces 114 may enable the occluded faces 114 to be disregarded when using an implicit function, such as a winding number function, to determine the values indicative of portions of the first mesh data 104 that are associated with the inner surface and outer surface of the object. An implicit function module 118 associated with the geometry processing server(s) 106 may use one or more functions, such as a signed or unsigned distance function, or a winding number function, to determine values based on one or more of the non-occluded faces 116 or the occluded faces 114. In some implementations, a first set of values (e.g., winding number values) associated with a winding number function may be determined based on the non-occluded faces 116 while disregarding the occluded faces 114, while both the occluded faces 114 and non-occluded faces 116 may be used in conjunction with an unsigned distance function to determine a second set of values (e.g., unsigned distance values). The first and second sets of values may then be used to determine values indicative of faces that represent the inner or outer surfaces of the object. For example, a winding number value may be determined by intersecting a polygon with one or more rays, each ray contributing to the winding number value based on the number of times the ray intersects an edge of the polygon. As a result, an even winding number value indicates that a point represented by the ray is outside of the polygon, while an odd winding number value indicates that the point represented by the ray is inside the polygon. A ray associated with each face of non-occluded faces 116 may be used to determine a winding number value indicative of whether the face is associated with the inner or outer surface of the object. The implicit function module 118 may access function data 120 that may include one or more functions, algorithms, rules, threshold values, weights, and so forth that may be used to determine a first set of function values 122 based on a first function and the non-occluded faces 116, and a second set of function values 124 based on a second function and both the occluded faces 114 and non-occluded faces 116.

A mesh generation module 126 associated with the geometry processing server(s) 106 may generate the second mesh data 108 based on the determined first function values 122 and second function values 124. As described previously, the second mesh data 108 may be generated at a selected offset distance from the outer surface faces of the first mesh data 104. The offset distance may be determined based on a distance that enables the second mesh data 108 to enclose the first mesh data 104 without intersecting the first mesh data 104. In some implementations, the offset distance may be determined in an iterative manner to enable a minimum offset distance to be determined. The mesh generation module 126 may access offset data 128, which may include one or more rules, algorithms, equations, threshold values, weights, and so forth that may be used to determine the offset distance and in some cases, one or more other characteristics of the second mesh data 108. The generated second mesh data 108 may have a smaller number of faces (e.g., a coarser resolution) than the first mesh data 104. In some implementations, the second mesh data 108 may include a tetrahedral mesh. Generating the second mesh data 108 with a smaller number of faces may enable alignment, orientation, and deformation processes to be performed based on the second mesh data 108 using a smaller amount of computational resources when compared to performance of similar operations based on the first mesh data 104. Additionally, generating second mesh data 108 that encloses the first mesh data 104 causes the second mesh data 108 to be a watertight mesh, which may further facilitate performance of alignment, orientation, and deformation processes.

In some implementations, the offset distance may be determined by computing a signed distance function based on the first mesh data 104, then, given an initial range of iso-values ($b_{min}=0$, $b_{max}=\|diag(S0)\|/2$), performing the following steps:

1) Extract an iso-surface ($S_i$) at a selected offset value $b=[(b_{max}+b_{min})/2]$ using only the outer surface faces ($S_O$) of the original first mesh data 104.
2) If the extracted iso-surface $S_i$ and the original surface $S_O$ intersect, let $b_{min}=b$.
3) Apply a decimation function to the iso-surface to form a surface having a coarser resolution ($S_d$).
4) If the coarser surface $S_d$ intersects the original surface $S_O$, let $b_{min}=b$. If the coarser surface $S_d$ does not intersect the original surface $S_O$, let $b_{max}=b$.

Through the iterative process described above, a minimum offset distance for generation of the second mesh data 108 may be determined that encloses the first mesh data 104 but does not intersect the first mesh data 104. The iterative process may be performed a selected number of times, such as ten times. In other implementations, the iterative process may be performed until an offset value that results in an intersection between the meshes is determined, and the preceding offset value may be used.

In some implementations, at least a portion of the second mesh data 108 that represents an inner surface of the object may be generated based on the portion of the second mesh data 108 that represents the outer surface of the object. For example, a closed-style article of footwear may have portions of the inner surface that are not readily visible. In such a case, the occlusion module 110 may be used to determine ambient occlusion values for at least a portion of the faces of the second mesh data 108, and faces associated with a value that indicates non-occlusion may be determined to represent the outer surface of the object. In some implementations, a probability function ($P_{i|o}$) may be used to determine faces associated with the inner and outer surfaces, such as by applying Laplacian smoothing ($\Delta$) to the ambient occlusion values (AO) to smooth noisy curvatures, then determine that faces associated with a value larger than a threshold value (such as 0.4) are associated with the outer surface of the second mesh data 108, as described in Equation 1:

$$P_{i|o}(v)=(I+\alpha\Delta)AO(v) \quad \text{(EQUATION 1)}$$

In some implementation, in Equation 1, above, the variable a may be set at a value of 10, and faces having a probability value below a threshold of 0.4 ($P_{i|o}(v)<0.4$) may be determined to be associated with the outer surface of the second mesh data 108.

Based on a characteristic of the object, such as a height, width, thickness, or type associated with an article of footwear, an offset distance may be determined, and a portion of the second mesh data 108 representing the inner surface may be generated that is spaced the determined offset distance from the outer surface.

In other implementations, such as when the object is an open-style article of footwear having visible portions of the inner surface, portions of the second mesh data 108 that represent the inner surface may be determined during the alignment and orientation process described with regard to FIG. 1B. For example, portions of the second mesh data 108 that represent the inner sole region may be determined based on the orientation of the faces, such as faces having an upward direction along a Y-axis having a larger probability of being associated with the inner sole portion of the footwear. In some implementations, a dot product function may be used to determine probability values that may be used to exclude faces associated with a low probability of being associated with the inner surface. After excluding these faces, the region of faces having the longest axis may be extracted as the sole region of the footwear.

As shown in FIG. 1B, after determining the second mesh data 108, an alignment module 130 associated with the geometry processing server(s) 106 may determine an alignment between the shape of the object represented by the second mesh data 108 and the shape of a second object represented by proxy data 132. The proxy data 132 may include one or more polygons, irregular shapes, or mesh data that represents the shape of an object that may be aligned and oriented relative to the object represented by the second mesh data 108. For example, the proxy data 132 may represent the geometric shape of a human foot and leg, which may be used to determine an alignment, orientation, and shape of the footwear represented by the second mesh data 108 when the footwear is positioned relative to a foot and leg, and to determine location data 102 associated with the first mesh data 104. For example, the proxy data 132 may have location data 102(1) associated therewith, such as keypoints, coordinates, or other indications of particular locations associated with the shape represented by the proxy data 132. For example, the location data 102(1) may include a set of points that represent parts of the human leg or foot represented by the proxy data 132, such as the ankle, heel, arch, ball of the foot, top of the foot, and so forth. The alignment module 130 may generate an alignment determination 134 indicative of an alignment and orientation between the shape represented by the second mesh data 108 and the shape represented by the proxy data 132. In some implementations, the alignment determination 134 may include scaling (e.g., changing one or more dimensions) of the shape represented by the second mesh data 108 and the shape represented by the proxy data 132. In some implementations, an alignment determination 134 may be determined using a best fit algorithm that aligns the long axes of the shapes, avoids or minimizes overlapping edges, and so forth.

For example, to align the representation of the shape of a human foot with that of an article of footwear, the portion of the second mesh data 108 that represents the inner sole region of the footwear may be determined and aligned with the portion of the proxy data 132 that represents the sole of the foot. The size of the representations of the footwear and foot may be scaled to match the length of the inner sole region, and median position matching between the representations of the foot and footwear on an x-z plane may be applied. Then the y-axis placement of the representations of the foot and footwear may be matched. In some implementations, a weight value for use aligning the sole region of the representation of the foot to the inner surface geometry of the representation of the footwear may be determined by assigning values to the top and bottom regions of the foot represented by the proxy data 132, such as a value of 0 for the top region and a value of 1 for the bottom region. Then, the highest Y-value vertex associated with the shape of the footwear may be projected to the shape of the foot represented by the proxy data 132. An isoline that matches the same value as the projected point on the foot may be extracted and associated with a bias value that enables output of adaptive smooth weights that have high values for points on the lower region of the footwear and lower values for points on the upper region of the footwear. Alignment of the shape of representation of a human foot with that of an article of footwear may also include aligning the ankle region represented by the proxy data 132 with a corresponding region of the shape of the footwear represented by the second mesh data 108. A similar weight function may be performed to fit the ankle represented by the proxy data 132 to the shape of the footwear represented by the second mesh data 108.

A deformation module 136 associated with the geometry processing server(s) 106 may deform the shape represented by the proxy data 132 to conform to the shape represented by the second mesh data 108, and in some implementations may subsequently deform the shape represented by the second mesh data 108 to conform to the deformed shape associated with the proxy data 312. In some implementations, an as-rigid-as-possible (ARAP) deformation may be used, in conjunction with one or more constraints indicated in constraint data 138. For example, constraints may include the bottom of the representation of the footwear being shaped as flat as possible, the sole region of the representation of the foot being shaped to conform to the inner sole region of the footwear, and the representation of the footwear being deformed to conform to the shape of the ankle region of the foot without intersecting the shape of the foot. In some cases, one or more portions that represent the upper regions of the footwear may be deformed to conform to the shape of to the top of the foot, resulting in the footwear having a shape that simulates being worn. In some cases, such as when the second mesh data 108 represents an open-style shoe, portions of the geometry that represent the inner surface may be ambiguous. After aligning the sole region of the foot with the inner sole region of the footwear and deforming the shape of the foot to conform to the shape of the sole region, the portions of the upper regions of the footwear that would be adjacent to the top of the foot may be determined to be part of the inner surface of the footwear.

As such, FIG. 1B depicts the deformation module 136(1) determining deformed proxy data 140 based on the alignment determination 134 and the constraint data 138. The deformed proxy data 140 may represent the shape of a foot in which the sole region of the foot conforms to the shape of the inner sole region of the footwear. In some cases, other portions of the representation of the shape of the foot, such as portions representing the heel, ankle, or one or more toes may be deformed to prevent intersection with the shape of the footwear, such as to simulate compression of the foot by a shoe. In some implementations, based on the alignment determination 134, the constraint data 138, and the deformed proxy data 140, the deformation module 136(2) may determine deformed second mesh data 142. The deformed second mesh data 142 may represent the shape of an article of footwear that has been deformed to conform to the shape of a foot. For example, after the shape of the foot has been deformed to conform to the inner sole region of the representation of the footwear, the representation of the ankle region of a shoe may be deformed to eliminate intersections between the shapes of the footwear and the ankle or other portions of the foot. In such case, the second mesh data 108 may be provided with a shape that would position the representation of the ankle region of the footwear adjacent to the representation of the ankle region of the foot. In some implementations, upper regions of the portion of the representation of the footwear may be deformed to a shape that would be more closely positioned adjacent to the top of the foot represented by the deformed proxy data 140. While FIG. 1B depicts an implementation in which a single deformation processes is used to determine deformed proxy data 140 and deformed second mesh data 142, in other implementations, multiple deformation processes may be performed. For example, after deforming the shape of an article of footwear represented by second mesh data 108, an additional deformation of the shape of the foot represented by proxy data 132 may be performed to further conform the shape of the foot to that of the footwear. In some cases, an additional deformation of the shape of the footwear may also be performed. Any number of iterations of deformation processes may be performed in this manner until the shapes represented by the proxy data 132 and second mesh data 108 converge without violating any constraint represented by the constraint data 138.

A model generation module 144 associated with the geometry processing server(s) 106 may determine annotated first mesh data 146 that associates location data 102(2) with the first mesh data 104. For example, after conforming the shape represented by the deformed second mesh data 142 to the shape represented by the deformed proxy data 140, the first mesh data 104 may be deformed in a manner that corresponds to the shape represented by the deformed proxy data 140. The location data 102(2) that is associated with the annotated first mesh data 146 may then be determined based on the locations of the location data 102(1) associated with the deformed proxy data 140. For example, a keypoint may be associated with the annotated first mesh data 146 at a location adjacent to a corresponding keypoint of the deformed proxy data 140.

Figure 2:
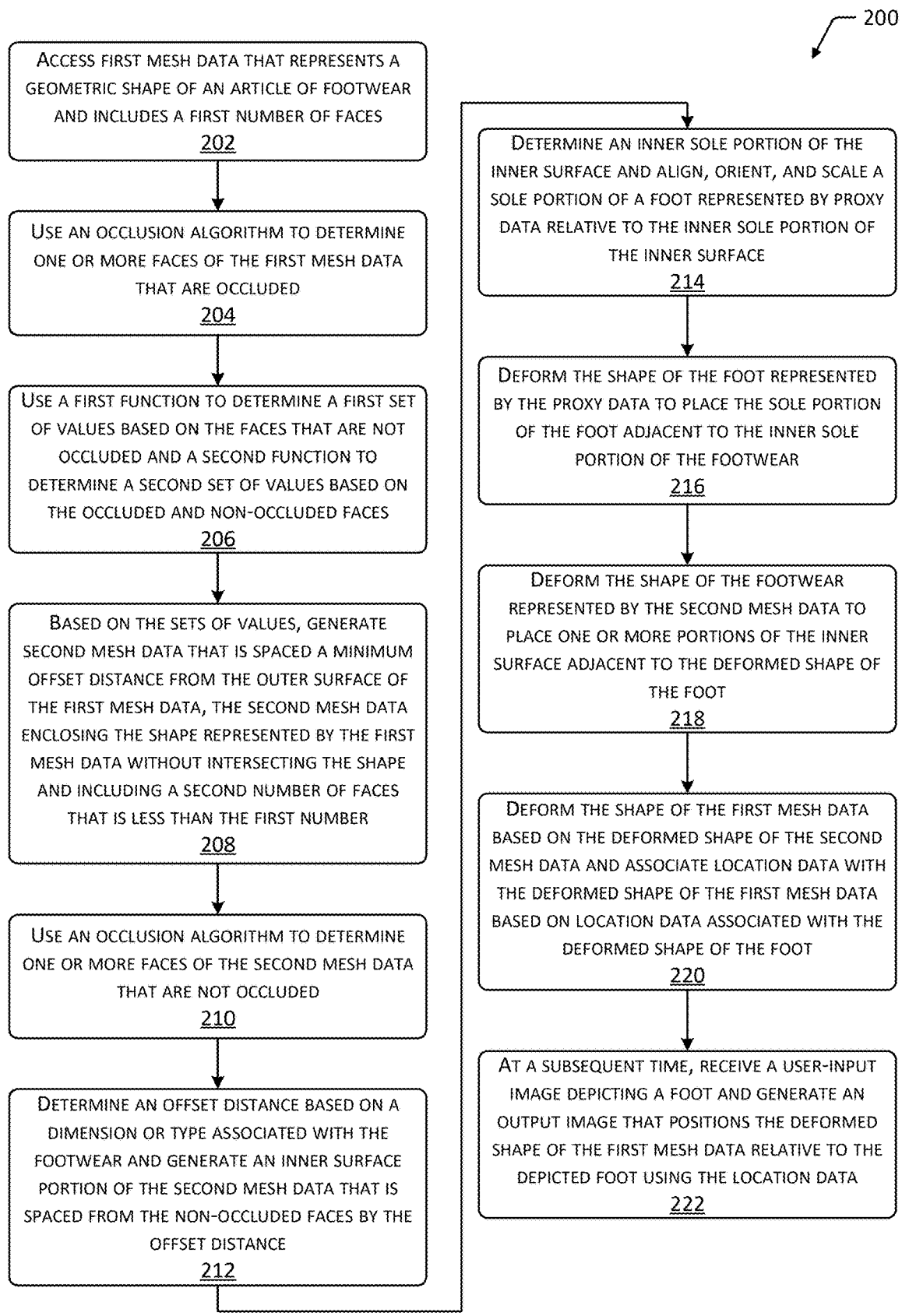
FIG. 2 is a flow diagram depicting an implementation of a method for determining a geometric mesh representing the shape of a closed-style type of footwear, associating location data with the mesh, and using the mesh to generate an output.

FIG. 2 is a flow diagram 200 depicting an implementation of a method for determining a geometric mesh representing the shape of a closed-style type of footwear, associating location data 102 with the mesh, and using the mesh to generate an output. At 202, first mesh data 104 that represents a geometric shape of an article of footwear may be accessed. The first mesh data 104 may include a first number of faces, texture data, and in some cases other data associated with the article of footwear. For example, the first mesh data 104 may be received from a seller or manufacturer of the footwear, determined by scanning one or more images or models of the footwear, and so forth. In some implementations, the first mesh data 104 may include a triangular mesh.

At 204, an occlusion algorithm may be used to determine one or more faces of the first mesh data 104 that are occluded. For example, an occlusion algorithm may determine values for at least a subset of the faces of the first mesh data 104, each value representing the extent to which a face is occluded, or a probability that a face is occluded. For example, an occlusion algorithm may be configured to determine, for a given face, a value ranging from 0 to 1, with a value of 0 indicating that a face is fully non-occluded and a value of 1 indicating that the face is fully occluded. Faces associated with a value greater than a threshold value may be determined to be occluded faces 114.

At 206, a first function may be used to determine a first set of values based on the faces that are not occluded, and a second function may be used to determine a second set of values based on the occluded and non-occluded faces. For example, a winding number function may be used to determine one or more values based on the non-occluded faces of the first mesh data 104, while disregarding the occluded faces, which may result in improved accuracy of the values determined using the winding number function. An unsigned distance function may be used to determine one or more values based on both the occluded and non-occluded faces of the first mesh data 104. The determined sets of values may be indicative of portions of the first mesh data 104 that represent the inner surface and the outer surface of the footwear. For example, in cases where the first mesh data 104 includes redundant, incomplete, or inaccurate faces that represent the inner surface of the footwear, such as when the footwear has an enclosed shape, a winding number function may determine inaccurate or unstable values. By using the occlusion algorithm to determine occluded faces 114 and disregarding occluded faces 114 when using the distance function, values that are determined may be more accurate.

At 208, second mesh data 108 may be generated based on the determined sets of values. The second mesh data 108 may be spaced a minimum offset distance from the outer surface of the first mesh data 104. The second mesh data 108 encloses the shape represented by the first mesh data 104 without intersecting the shape and has a second number of faces that is smaller than the first number of faces included in the first mesh data 104. In some implementations, the offset minimum distance may be determined in an iterative manner. For example, if a mesh generated at a particular offset distance intersects the shape represented by the first mesh data 104, the mesh may subsequently be generated using a larger offset distance, while if the mesh generated at a particular offset distance does not intersect the shape represented by the first mesh data 104, the mesh may subsequently be generated using a smaller offset distance. The second mesh data 108 may be a watertight mesh. In some implementations, the second mesh data 108 may be a tetrahedral mesh.

At 210, an occlusion algorithm may be used to determine one or more faces of the second mesh data 108 that are not occluded. For example, to generate portions of the second mesh data 108 that represent the inner surface of an article of footwear, non-occluded faces that represent the outer surface may be determined, and the inner surface may be generated within the outer surface. The occlusion algorithm that is used to determine the non-occluded faces 116 may be the same occlusion algorithm used to determine occluded faces 114 at 204, or a different occlusion algorithm.

At 212, an offset distance may be determined based on a dimension or type associated with the footwear, and an inner surface portion of the second mesh data 108 may be generated that is spaced from the non-occluded faces 116 by the offset distance. For example, based on the height, length, width, or thickness of the article of footwear represented by the first mesh data 104, an offset distance for spacing the inner surface from the outer surface may be determined. Continuing the example, a greater offset distance may be determined for larger or thicker footwear, while smaller offset distances may be determined for smaller or thinner footwear. In other implementations, a type or category associated with the footwear, such as sneakers or sandals, may be used to determine an offset distance associated with the type or category.

At 214, an inner sole portion of the inner surface of the second mesh data 108 may be determined, and the sole portion of a foot represented by proxy data 132 may be aligned, oriented, and scaled relative to the inner sole portion of the inner surface. In some implementations, the size of the footwear or foot may be scaled to match the length of the inner sole region to that of the foot. Median position matching between the foot and shoe on an x-z plane may be applied, then the y-axis placement of the foot and shoe may be matched. In some implementations, a weight value may be used for aligning the sole region of the foot to the inner surface geometry of the footwear. The weight value may be determined by assigning values to the top and bottom regions of the foot, projecting the highest Y-value vertex associated with the shape of the footwear to the shape of the foot, and determining an isoline that matches the same value as the projected point on the foot.

At 216, the shape of the foot represented by the proxy data 132 may be deformed to conform the sole portion of the foot adjacent to the shape of the representation of the inner sole portion of the footwear. In some implementations, an as-rigid-as-possible (ARAP) deformation may be used, in conjunction with one or more constraints. For example, constraints may include the bottom of the representation of the footwear being shaped as flat as possible, the sole region of the representation of the foot being shaped to conform as closely as possible to the inner sole region of the footwear, and the representation of the footwear being deformed to correspond to the ankle region of the foot without intersecting the shape of the foot. As such, at 216, the representation of the sole portion of the foot may be shaped to conform to that of the inner sole portion of the footwear while remaining as flat as possible, while representations of the upper portions of the foot may be moved to maintain the dimensions of the shape of the foot. In some cases, portions of the shape of the foot, such as portions representing the heel, ankle, or one or more toes may be deformed to prevent intersection with the shape of the footwear, such as to simulate compression of the foot by the footwear.

At 218, the shape of the footwear represented by the second mesh data 108 may be deformed to conform to the deformed representation of the shape of the foot, which may provide the representation of the footwear with a shape that would position the inner surface adjacent to the deformed representation of the shape of the foot. For example, after the shape of the foot has been deformed to conform to the representation of the inner sole region of the footwear, the representation of the ankle region of a shoe may be deformed to eliminate intersections between the shape of the footwear and the representation of the ankle, and in some cases to provide the representation of the footwear with a shape that would position the ankle region of the footwear adjacent to the ankle region of the foot. In some implementations, an upper portion of the footwear may be deformed to a shape that would position the upper portion of the footwear adjacent to the top of the foot represented by the proxy data 132. In other implementations, the shape of the footwear may not be deformed, such as if the second mesh data 108 represents a type of footwear that is generally rigid.

In some implementations, after deforming the shape of the representation of the footwear at 218, the shape of the representation of the foot represented by the proxy data 132 may be deformed a subsequent time. For example, deformation of the shape of the representation of the footwear may cause the position of the shape of the representation of the foot to violate one or more constraints or to be positioned suboptimally relative to the shape of the foot. The shape of the foot and that of the footwear may be iteratively deformed in an alternating manner until no constraints are violated and the foot and footwear are optimally positioned relative to one another.

At 220, the shape of the first mesh data 104 may be deformed based on the deformed shape of the second mesh data 108, and location data 102(2) may be associated with the representation of the deformed shape of the first mesh data 104 based on location data 102(1) associated with the deformed shape of the foot. For example, the proxy data 132 may be associated with location data 102(1), such as a set of points that correspond to the locations of particular parts of the foot and leg within the shape represented by the proxy data 132. When the shape of the foot represented by the proxy data 132 is deformed, the deformed proxy data 140 may retain the set of points, but the position of one or more points may be moved when the portion of the proxy data 132 with which the point is associated is moved. When the shape of the foot represented by the deformed proxy data 140 is positioned relative to the shape of the footwear represented by the deformed first mesh data 104, location data 102(2) for the first mesh data 104 may be determined based on the positions of the points associated with the deformed proxy data 140. For example, a point may be placed within the shape represented by the first mesh data 104 at a location adjacent to a corresponding point of the location data 102(1) in the shape represented by the deformed proxy data 140.

At 222, at a subsequent time, a user-input image may be received. The user-input image may depict a foot. An output image may be generated that positions the deformed shape of the footwear relative to the depicted foot using the location data 102(2). For example, one or more machine learning systems, computer vision algorithms, or other methods may be used to analyze the user-input image to determine locations of particular parts of the foot within the image. The shape of the footwear represented by the annotated first mesh data 146 may be aligned and oriented relative to the image of the foot depicted in the user-input image by positioning each point of the location data 102(2) adjacent to the corresponding part of the foot represented by the point. The resulting output image may therefore depict the footwear in a manner that is correctly aligned and oriented with the foot, and the footwear may have a shape representative of the footwear as it is worn. For example, the output image may be generated as part of an AR or VTO process that depicts an article of footwear positioned relative to the foot depicted in an input image to simulate the appearance of the footwear being worn.

Figure 3:
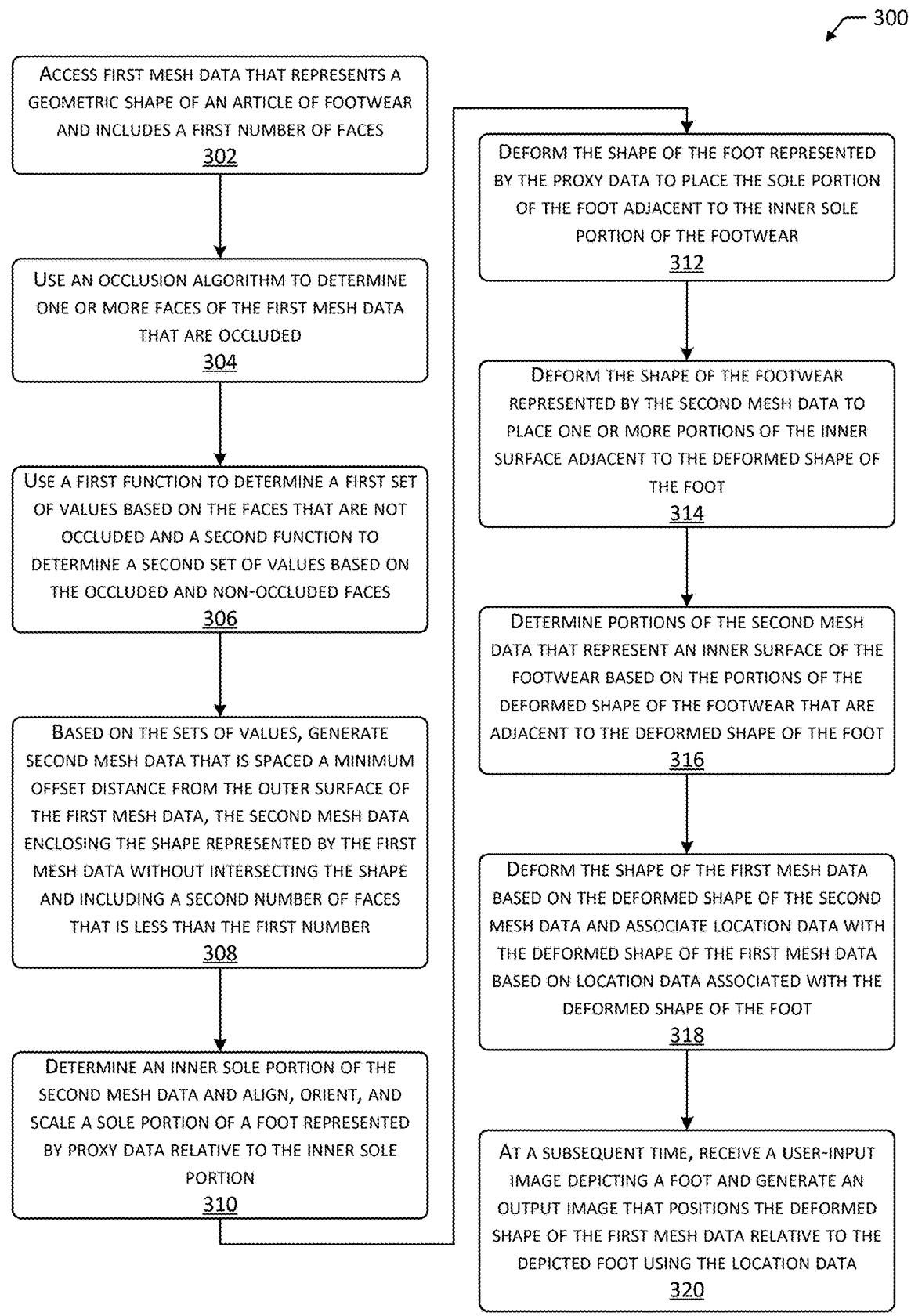
FIG. 3 is a flow diagram depicting an implementation of a method for determining a geometric mesh representing the shape an open-style type of footwear, associating location data with the mesh, and using the mesh to generate an output.

FIG. 3 is a flow diagram 300 depicting an implementation of a method for determining a geometric mesh representing the shape of an open-style type of footwear, associating location data 102 with the mesh, and using the mesh to generate an output. At 302, first mesh data 104 that represents a geometric shape of an article of footwear and includes a first number faces may be accessed.

At 304, an occlusion algorithm may be used to determine one or more faces of the first mesh data 104 that are occluded.

At 306, a first function may be used to determine a first set of values based on the faces that are not occluded, and a second function may be used to determine a second set of values based on the occluded and non-occluded faces. As described previously, determining and disregarding occluded faces 114 of the first mesh data 104 may improve the accuracy and stability of values determined using winding number functions or other types of functions. The determined sets of values may be indicative of portions of the first mesh data 104 that represent the inner surface and the outer surface of the footwear.

At 308, based on the sets of values, second mesh data 108 may be generated that is spaced a minimum offset distance from the outer surface of the first mesh data 104. The second mesh data 108 encloses the shape represented by the first mesh data 104 without intersecting the shape and includes a second number of faces that is less than the first number of faces included in the first mesh data 104.

At 310, an inner sole portion of the second mesh data 108 may be determined, and the sole portion of a foot represented by proxy data 132 may be aligned, oriented, and scaled relative to the representation of the inner sole portion. In cases where the footwear includes an open-style of footwear, at least a portion of the inner sole may be visible (e.g., non-occluded). As such, use of an occlusion algorithm and generation of the inner surface spaced at an offset distance from the non-occluded faces 116, described with regard to FIG. 2 at 208 and 210, may be omitted.

At 312, the shape of the foot represented by the proxy data 132 may be deformed to conform the shape of the sole portion of the representation of the foot to the shape of the inner sole portion of the representation of the footwear. In some implementations, positioning the representation of the shape of the foot relative to the representation of the footwear may enable portions of the shape of the footwear that are adjacent to the shape of the foot to be determined as parts of the inner surface of the footwear.

At 314, the shape of the footwear represented by the second mesh data 108 may be deformed to conform to the shape of the deformed representation of the foot, which may provide the representation of the footwear with a shape that would place one or more portions of the inner surface adjacent to the deformed representation of the shape of the foot. For example, portions of the representation of the footwear that are proximate to the shape of the foot may be determined to be parts of the inner surface of the footwear and in some implementations may be positioned adjacent to the shape of the foot. In other implementations, deformation of the shape of the footwear may be omitted, such as when the article of footwear includes a generally rigid type of footwear. The deformation or non-deformation of the shape of the footwear may be indicated in constraint data 138.

At 316, portions of the second mesh data 108 that represent an inner surface of the footwear may be determined based on the portions of the deformed shape of the footwear that are adjacent to the deformed shape of the foot. As described previously, after positioning the representation of the shape of the foot relative to the shape of the footwear, portions of the shape of the footwear that are adjacent to the shape of the foot may be determined to be part of the inner surface of the footwear.

At 318, the shape of the first mesh data 104 may be deformed based on the deformed shape of the second mesh data 108, and location data 102(2) may be associated with the deformed shape of the first mesh data 104 based on location data 102(1) associated with the deformed shape of the foot.

At 320, at a subsequent time, a user-input image may be received that depicts a foot, and an output image may be generated that positions the deformed shape of the footwear relative to the depicted foot using the location data 102(2).

Figure 4A:
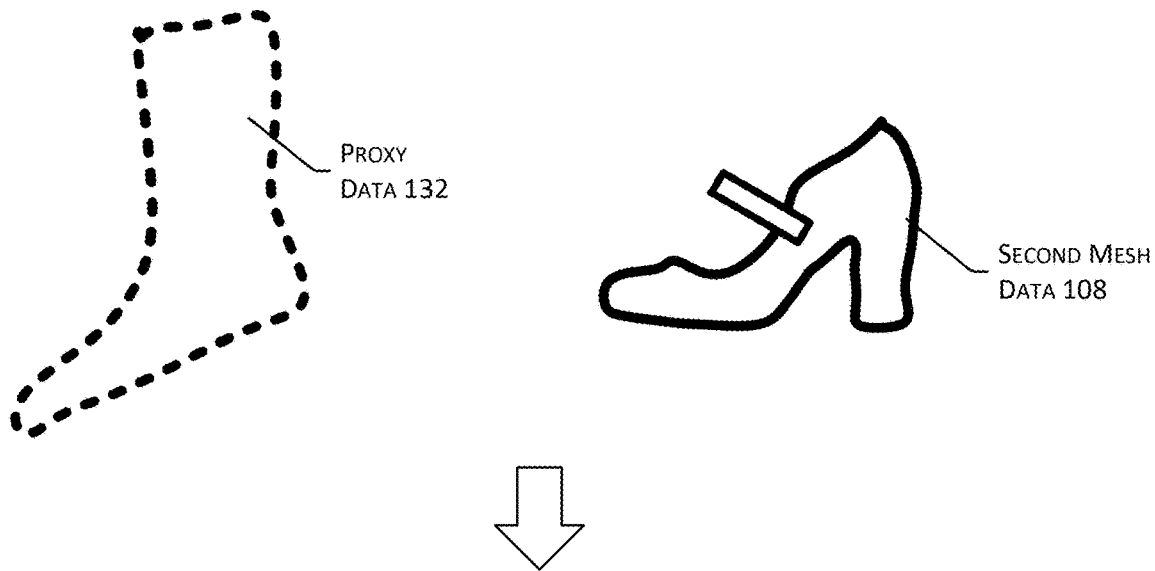
FIGS. 4A and 4B are a diagram depicting an implementation of an alignment and deformation process to determine a shape of a geometric mesh representing an article of footwear relative to the shape of a foot represented by proxy data for association of location data with the mesh.
Figure 4A:
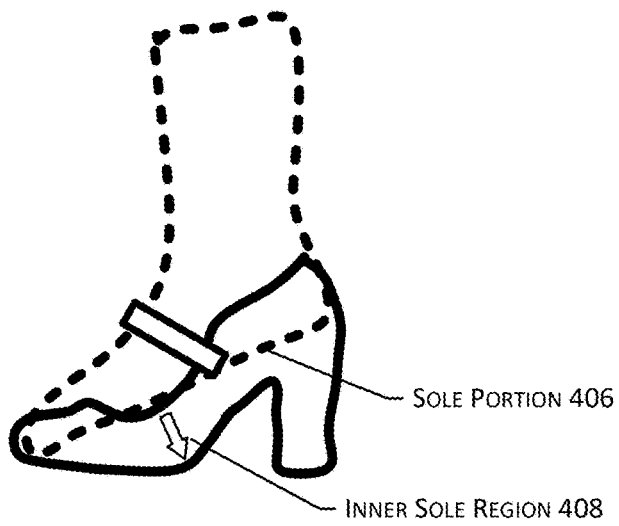
Figure 4B:
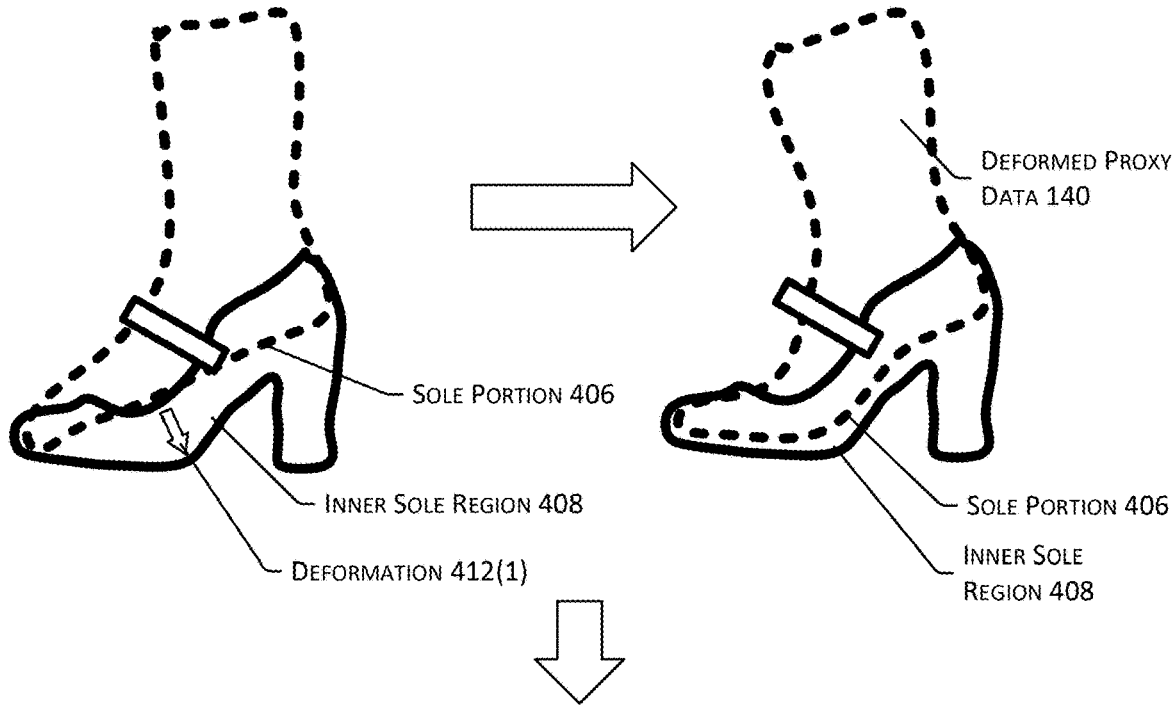
Figure 4B:
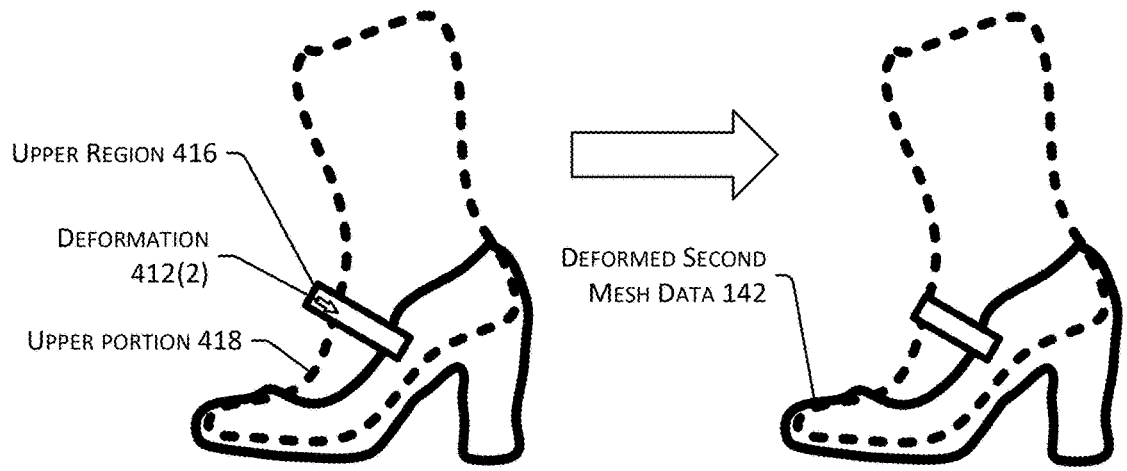

FIGS. 4A and 4B are a diagram 400 depicting an implementation of an alignment and deformation process to determine a shape of a geometric mesh representing an article of footwear relative to the shape of a foot represented by proxy data 132 for association of location data 102 with the mesh. At 402, second mesh data 108 and proxy data 132 may be accessed. The second mesh data 108 represents the shape of an article of footwear, while the proxy data 132 represents the shape of a foot. As described previously, the proxy data 132 may have location data 102(1) associated therewith, such as keypoints that indicate locations of particular portions of the foot within the shape represented by the proxy data 132. Alignment and deformation of the representation of the shape of the foot relative to the shape of the footwear, and in some implementations deformation of the representation of the shape of the footwear, may enable location data 102(1) associated with the proxy data 132 to be used to determine location data 102(2) for the first mesh data 104, which in turn may be used to generate output images that position the article of footwear represented by the first mesh data 104 relative to a foot depicted in a user-input image.

At 404, the representation of the sole portion 406 of the shape of the foot may be aligned with the representation of the inner sole region 408 of the shape of the article of footwear. As described previously, in some implementations, alignment of the sole portion 406 with the inner sole region 408 may include scaling one or more of the representation of the shape of the foot or the representation of the shape of the footwear, median position matching between the representations of the foot and footwear on an x-z plane may be applied, then the y-axis placement of the representations of the foot and footwear may be matched. A weight value for use aligning the sole portion 406 with the inner surface geometry of the footwear may be determined by assigning values to the top and bottom regions of the representation of the foot, projecting the highest Y-value vertex associated with the shape of the footwear to the shape of the foot, and extracting an isoline that matches the same value as the projected point on the representation of the foot.

At 410, the representation of the shape of the foot may be deformed to position the sole portion 406 of the shape of the foot adjacent to the representation of the inner sole region 408 of the shape of the article of footwear. For example, FIG. 4B depicts an example deformation 412(1) in which the shape of the foot represented by the proxy data 132 initially includes a generally flat sole portion 406, while the inner sole region 408 of the footwear includes a curved shape. After applying the deformation 412(1), the deformed proxy data 140 represents the shape of the foot having a curved sole portion 406 that is adjacent to the inner sole region 408 of the footwear.

At 414, the representation of the shape of the article of footwear may be deformed to position an upper region 416 of the shape of the footwear adjacent to an upper portion 418 of the representation of the shape of the foot. For example, FIG. 4B depicts an example deformation 412(2) in which the shape of the footwear includes an upper region 416 that is spaced from the upper portion 418 of the shape of the foot. After applying the deformation 412(2), the deformed second mesh data 142 may represent the shape of the footwear having the upper region 416 positioned adjacent to the upper portion 418 of the foot.

As described previously with regard to FIGS. 1-3, after determining the deformed shapes of the representations of the foot and footwear, the shape of the first mesh data 104 may be deformed to correspond to the deformed shape of the second mesh data 108, and location data 102(1) associated with the deformed proxy data 140 may be used to determine location data 102(2) to be associated with the deformed first mesh data 104. The determined location data 102(2) and the shape of the article of footwear represented by the first mesh data 104 may then be used to generate output images based on user-input images.

Figure 5:
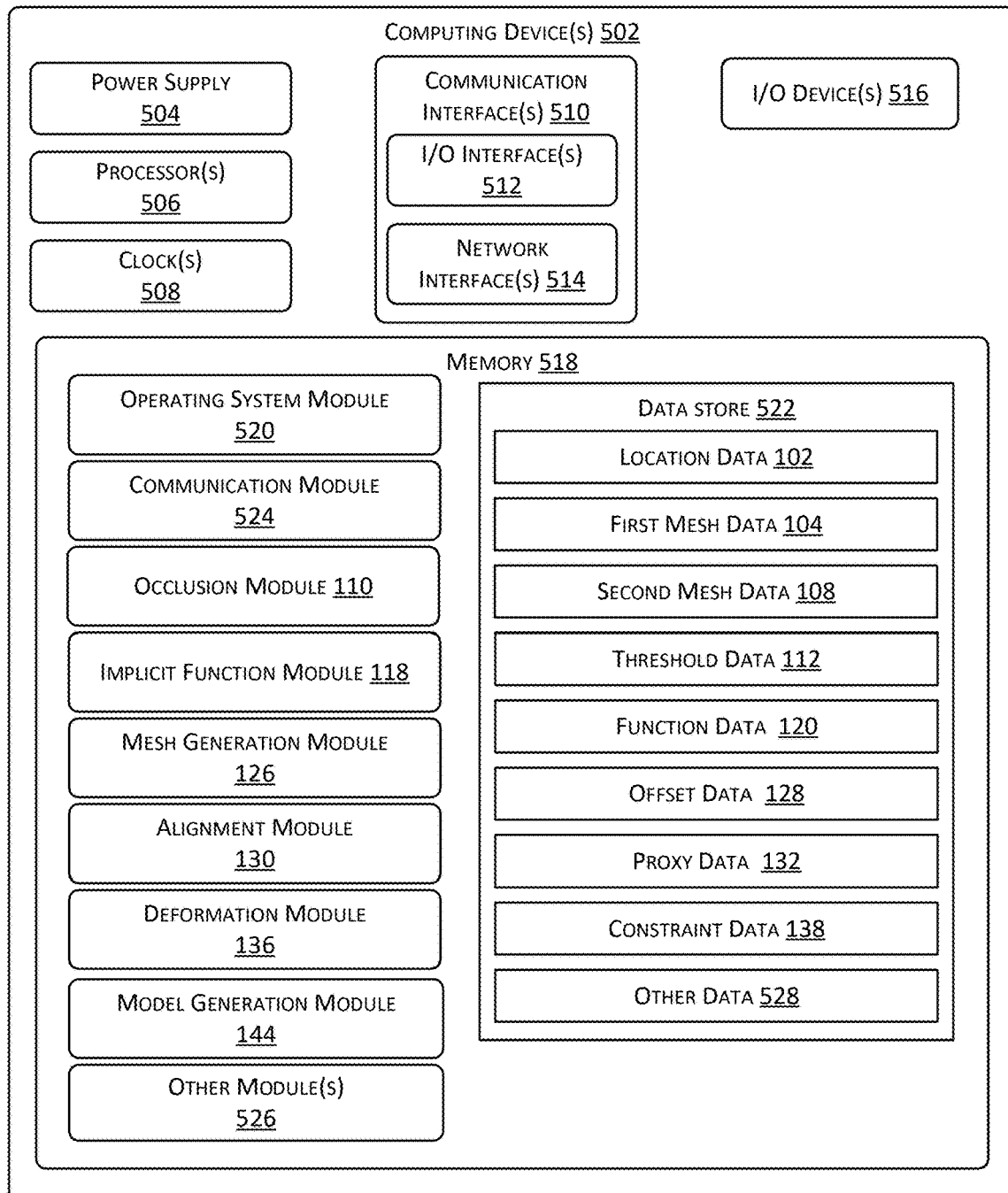
FIG. 5 is a block diagram depicting an implementation of a computing device within the present disclosure.

FIG. 5 is a block diagram 500 depicting an implementation of a computing device 502 within the present disclosure. The computing device 502 may include one or more geometry processing servers 106, as described with regard to FIGS. 1A and 1B. However, in some implementations, one or more computing devices associated with manufacturers or sellers of items or other sources of mesh data, computing devices associated with users requesting generation of output images, and so forth may be included. As such, while FIG. 5 depicts a single block diagram 500, the depicted computing device 502 may include any number of computing devices of similar or different types. For example, different computing devices 502 or groups of computing devices 502 may be used to receive input data, generate mesh data, determine occlusion values, determine inner and outer surfaces, generate output images, and so forth.

One or more power supplies 504 may be configured to provide electrical power suitable for operating the components of the computing device 502. In some implementations, the power supply 504 may include a rechargeable battery, fuel cell, photovoltaic cell, power conditioning circuitry, and so forth.

The computing device 502 may include one or more hardware processor(s) 506 (processors) configured to execute one or more stored instructions. The processor(s) 506 may include one or more cores. One or more clock(s) 508 may provide information indicative of date, time, ticks, and so forth. For example, the processor(s) 506 may use data from the clock 508 to generate a timestamp, trigger a preprogrammed action, and so forth.

The computing device 502 may include one or more communication interfaces 510, such as input/output (I/O) interfaces 512, network interfaces 514, and so forth. The communication interfaces 510 may enable the computing device 502, or components of the computing device 502, to communicate with other computing devices 502 or components of the other computing devices 502. The I/O interfaces 512 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 512 may couple to one or more I/O devices 516. The I/O devices 516 may include any manner of input devices or output devices associated with the computing device 502. For example, I/O devices 516 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 516 may be physically incorporated with the computing device 502. In other implementations, I/O devices 516 may be externally placed.

The network interfaces 514 may be configured to provide communications between the computing device 502 and other devices, such as the I/O devices 516, routers, access points, and so forth. The network interfaces 514 may include devices configured to couple to one or more networks including local area networks (LANs), wireless LANs (WLANs), wide area networks (WANs), wireless WANs, and so forth. For example, the network interfaces 514 may include devices compatible with Ethernet, Wi-Fi, Bluetooth, ZigBee, Z-Wave, 3G, 4G, 5G, LTE, and so forth.

The computing device 502 may include one or more buses or other internal communications hardware or software that allows for the transfer of data between the various modules and components of the computing device 502.

As shown in FIG. 5, the computing device 502 may include one or more memories 518. The memory 518 may include one or more computer-readable storage media (CRSM). The CRSM may be any one or more of an electronic storage medium, a magnetic storage medium, an optical storage medium, a quantum storage medium, a mechanical computer storage medium, and so forth. The memory 518 may provide storage of computer-readable instructions, data structures, program modules, and other data for the operation of the computing device 502. A few example modules are shown stored in the memory 518, although the same functionality may alternatively be implemented in hardware, firmware, or as a system on a chip (SoC).

The memory 518 may include one or more operating system (OS) modules 520. The OS module 520 may be configured to manage hardware resource devices such as the I/O interfaces 512, the network interfaces 514, the I/O devices 516, and to provide various services to applications or modules executing on the processors 506. The OS module 520 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 522 and one or more of the following modules may also be associated with the memory 518. The modules may be executed as foreground applications, background tasks, daemons, and so forth. The data store(s) 522 may use a flat file, database, linked list, tree, executable code, script, or other data structure to store information. In some implementations, the data store(s) 522 or a portion of the data store(s) 522 may be distributed across one or more other devices including other computing devices, network attached storage devices, and so forth.

A communication module 524 may be configured to establish communications with one or more other computing devices 502. Communications may be authenticated, encrypted, and so forth.

The memory 518 may also store the occlusion module 110. The occlusion module 110 may determine occlusion values for one or more faces represented by mesh data, the value for a particular face representing an amount by which the face is occluded or a probability that the face is occluded. Occlusion values may be used to facilitate determination of values using various implicit functions, and the values may be indicative of portions of the mesh data that represent the inner and outer surfaces of an object. In some implementations, the occlusion module 110 may access threshold data 112, which may represent one or more values indicative of occlusion, non-occlusion, or partial occlusion of faces. For example, based on a relationship between the occlusion value for one or more faces and one or more threshold values, the occlusion module 110 may determine faces that are occluded or non-occluded.

The memory 518 may additionally store the implicit function module 118. The implicit function module 118 may use one or more functions, such as a winding number function, an unsigned distance function, or a signed distance function, to determine values based on one or more faces represented by mesh data. The values may be indicative of faces that are included in the inner surface and outer surface of an object. In some implementations, the implicit function module 118 may determine values by disregarding occluded faces determined using the occlusion module 110, which may improve the accuracy of values determined using a winding number or other functions. The implicit function module 118 may access function data 120 that may include one or more functions, algorithms, rules, threshold values, weights, and so forth that may be used to determine faces that are part of the inner surface or outer surface of an object.

The memory 518 may store the mesh generation module 126. The mesh generation module 126 may generate second mesh data 108 based on characteristics determined from first mesh data 104, values determined using the implicit function module 118, or combinations thereof. The second mesh data 108 may be generated at a selected offset distance from the outer surface of the first mesh data 104, the offset distance enabling the shape represented by the second mesh data 108 to enclose the shape represented by the first mesh data 104 without intersecting the first mesh data 104. In some implementations, the offset distance may be determined in an iterative manner to enable a minimum offset distance to be determined. The mesh generation module 126 may access offset data 128, which may include one or more rules, algorithms, equations, threshold values, weights, and so forth that may be used to determine offset distance and in some cases, one or more other characteristics of the second mesh data 108, such as a resolution or number of faces associated with the second mesh data 108. In some implementations, at least a portion of the second mesh data 108 that represents an inner surface of the object may be generated based on the portion of the second mesh data 108 that represents the outer surface of the object. For example, the occlusion module 110 may be used to determine occlusion values for at least a portion of the faces of the second mesh data 108, and faces associated with a value that indicates non-occlusion may be determined to represent the outer surface of the object. Based on a characteristic of the object an offset distance may be determined, and a portion of the second mesh data 108 representing the inner surface may be generated that is spaced at the determined offset distance from the outer surface.

The memory 518 may also store the alignment module 130. The alignment module 130 may determine an alignment between the shape of a first object represented by the mesh data and the shape of a second object represented by proxy data 132. The alignment module 130 may generate an alignment determination 134 indicative of an alignment and orientation between the shape represented by the mesh data and the shape represented by the proxy data 132, which in some cases may include scaling one or more of the shapes. For example, after scaling the shapes to match the length of long axes of the shapes, and median position matching on an x-z plane may be applied, followed by matching y-axis positioning. One or more weight values may be determined and used for aligning regions of the objects.

The memory 518 may additionally store the deformation module 136. The deformation module 136 may deform shapes represented by mesh data and proxy data 132 to conform to the shape(s) represented by other data. In some implementations, an as-rigid-as-possible (ARAP) deformation may be used, in conjunction with one or more constraints indicated in constraint data 138. For example, the deformation module 136 may deform the surface of a first object to a shape that would position the surface adjacent to a surface of a second object, such as by conforming the shape of a representation of the sole portion of a foot to conform to the shape of a representation of the inner sole region of an article of footwear. In some implementations, the second object may also be deformed relative to the first object, such as by conforming representations of portions of the article of footwear adjacent to the shape of an upper portion of the representation of the foot. In some implementations, multiple deformations may be performed. For example, deforming the representation of the second object may cause a second deformation of the representation of the first object to be possible to optimize the conformation between the shapes of the objects.

The memory 518 may store the model generation module 144. The model generation module 144 may deform the shape represented by first mesh data 104 based on the shape of corresponding second mesh data 108, then associate location data 102 with selected locations represented by the first mesh data 104. For example, after deforming the shape of a first object relative to that of a second object, the position of location data 102 associated with the shape of the first object may be used to associate location data 102 with corresponding locations on the first mesh data 104 representing the second object that are adjacent to the locations of the first object.

Other modules 526 may also be present in the memory 518. For example, other modules 526 may include modules for receiving user input images and generating output images based on mesh data and location data 102. Other modules 526 may include permission or authorization modules for sending data to or receiving data from the computing device 502, for modifying configurations or settings, for modifying threshold data 112, function data 120, offset data 128, proxy data 132, or constraint data 138, and so forth. Other modules 526 may also include encryption modules to encrypt and decrypt communications between computing devices 502, authentication modules to authenticate communications sent or received by computing devices 502, user interface modules to generate interfaces for presenting output, receiving input from users, and so forth. Other modules 526 may also include training modules for training various machine learning algorithms.

Other data 528 within the data store(s) 522 may include configurations, settings, preferences, and default values associated with computing devices 502. Other data 528 may also include encryption keys and schema, access credentials, and so forth. Other data 528 may include various rules, algorithms, and thresholds for performance of various tasks. Other data 528 may include training data and parameters for various machine learning networks. Other data 528 may also include user interface data for generation of interfaces to receive user input and present output.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more non-transitory memories storing computer-executable instructions; and
one or more hardware processors to execute the computer-executable instructions to:
 access first mesh data that represents a first geometric shape of an article of footwear, the first mesh data comprising a first plurality of faces;
 use an ambient occlusion algorithm to determine ambient occlusion values for at least a subset of the first plurality of faces;
 determine that an ambient occlusion value associated with a first portion of the first plurality of faces is greater than a first threshold value;
 use a winding number function to determine winding number values for a second portion of the first plurality of faces, wherein the second portion excludes the first portion;
 use an unsigned distance function to determine unsigned distance values for the first portion and the second portion of the first plurality of faces;
 based on the winding number values and the unsigned distance values, determine a minimum offset distance for generation of second mesh data comprising a second plurality of faces that is spaced from the first plurality of faces by the minimum offset distance, wherein the second plurality of faces encloses the first plurality of faces and does not intersect the first plurality of faces, and wherein the second plurality of faces has a second count of faces that is less than a first count of faces of the first plurality of faces;
 determine a third portion of the second mesh data that represents an inner sole of the article of footwear;
 access proxy data that represents a second geometric shape of a human foot, wherein the second geometric shape is associated with a first plurality of keypoints, wherein each keypoint of the first plurality of keypoints represents a respective portion of the human foot;
 determine an alignment between the second geometric shape of the human foot with the third portion of the second mesh data that represents the inner sole of the article of footwear;
 determine a third geometric shape of the human foot by deforming the second geometric shape of the human foot to position at least a portion of the third geometric shape that represents the human foot proximate to the third portion of the second mesh data that represents the inner sole of the article of footwear;
 determine a fourth geometric shape of the article of footwear by deforming the first geometric shape to position a fourth portion of the second mesh data proximate to the third geometric shape that represents the human foot;
 determine a fifth geometric shape of the first mesh data based on the fourth geometric shape of the article of footwear represented by the second mesh data; and
 associate a second plurality of keypoints with the first mesh data based on one or more locations of the first plurality of keypoints relative to one or more of the fourth geometric shape or the fifth geometric shape.

2. The system of claim 1, wherein the computer-executable instructions to determine the third portion of the second mesh data that represents the inner sole of the article of footwear comprise computer-executable instructions to:
 use the ambient occlusion algorithm to determine ambient occlusion values for at least a subset of the second plurality of faces;
 determine that an ambient occlusion value associated with a fifth portion of the second plurality of faces is less than a second threshold value;
 determine a second offset distance based on one or more of a height, a width, a thickness, or a type associated with the article of footwear; and
 determine a sixth portion of the second plurality of faces that is spaced the second offset distance from the fifth portion of the second plurality of faces, wherein the sixth portion of the second plurality of faces includes the third portion of the second mesh data.

3. The system of claim 1, wherein the computer-executable instructions to determine the fourth geometric shape of the article of footwear by deforming the first geometric shape comprise computer-executable instructions to:
 determine that the fourth portion of the second mesh data is closer to the third geometric shape of the human foot than a fifth portion of the second mesh data;
 wherein the fourth portion of the second mesh data is positioned proximate to the third geometric shape in response to the fourth portion of the second mesh data being closer to the third geometric shape than the fifth portion.

4. A system comprising:
one or more non-transitory memories storing computer-executable instructions; and
one or more hardware processors to execute the computer-executable instructions to:
 determine first mesh data that represents a first geometric shape of a first object, the first mesh data comprising a first plurality of faces;
 determine a first portion of the first plurality of faces that is occluded;
 use a first function to determine one or more first values for a second portion of the first plurality of faces, wherein the second portion excludes the first portion;
 use a second function to determine one or more second values for the first portion and the second portion of the first plurality of faces;
 based on the one or more first values and the one or more second values, generate second mesh data comprising a second plurality of faces that is spaced from the first plurality of faces by an offset distance, wherein the second plurality of faces encloses the first plurality of faces and does not intersect the first plurality of faces, and wherein the second plurality of faces has a second count of faces that is less than a first count of faces of the first plurality of faces;
 determine proxy data comprising a representation of a second geometric shape of a second object;
 determine an alignment between the second geometric shape and a third portion of the second plurality of faces;
 determine a third geometric shape of the second object that conforms to at least a portion of the representation of the second object to the third portion of the second plurality of faces; and associate location data with the first mesh data based on one or more locations of the third geometric shape relative to one or more of the first mesh data or the second mesh data.

5. The system of claim 4, further comprising computer-executable instructions to:

use an ambient occlusion algorithm to determine ambient occlusion values for the first portion of the first plurality of faces; and determine that the ambient occlusion values associated with the first portion of the first plurality of faces are greater than a threshold value indicative of occlusion of a face;

wherein the first portion of the first plurality of faces is determined to be occluded based on the ambient occlusion values.

6. The system of claim 4, wherein the first function comprises a winding number function and the second function comprises an unsigned distance function.

7. The system of claim 4, further comprising computer-executable instructions to:

at a first time, determine that generation of the second mesh data a first distance from the first plurality of faces does not intersect the first plurality of faces;

at a second time after the first time, determine that generation of the second mesh data a second distance from the first plurality of faces does not intersect the first plurality of faces, wherein the second distance is less than the first distance; and at a third time after the second time, determine that generation of the second mesh data a third distance from the first plurality of faces intersects the first plurality of faces, wherein the third distance is less than the second distance;

wherein the second distance is used as the offset distance in response to the generating the second mesh data at the third distance intersecting the first plurality of faces.

8. The system of claim 4, further comprising computer-executable instructions to:

at a first time, determine that generation of the second mesh data a first distance from the first plurality of faces does not intersect the first plurality of faces; and at a second time after the first time, determine that generation of the second mesh data a second distance from the first plurality of faces intersects the first plurality of faces, wherein the second distance is less than the first distance;

wherein the first distance is used as the offset distance in response to the generating the second mesh data at the second distance intersecting the first plurality of faces.

9. The system of claim 4, further comprising computer-executable instructions to:

use an ambient occlusion algorithm to determine ambient occlusion values for a fourth portion of the second plurality of faces;

determine that the ambient occlusion values associated with the fourth portion of the second plurality of faces are less than a threshold value indicative of non-occlusion of a face;

determine a second offset distance based on a characteristic of the first object; and determine a fifth portion of the second plurality of faces that is spaced the second offset distance from the fourth portion of the second plurality of faces, wherein the fifth portion of the second plurality of faces includes the third portion of the second plurality of faces.

10. The system of claim 4, further comprising computer-executable instructions to:

determine a fourth geometric shape of the first object by conforming a fourth portion of the second mesh data to at least a portion of the third geometric shape of the second object.

11. The system of claim 10, wherein the computer-executable instructions to determine the fourth geometric shape of the first object comprise computer-executable instructions to:

determine that the fourth portion of the second mesh data is closer to the third geometric shape of the second object than a fifth portion of the second mesh data;

wherein the fourth portion of the second mesh data is positioned proximate to the third geometric shape in response to the fourth portion of the second mesh data being closer to the third geometric shape than the fifth portion.

12. The system of claim 10, further comprising computer-executable instructions to:

determine a fifth geometric shape of the first mesh data by conforming the first mesh data to the fourth geometric shape of the first object;

determine one or more first locations of one or more first points of the third geometric shape indicated in the proxy data; and determine one or more second locations of the second mesh data that are adjacent to the one or more first locations;

wherein the location data is determined based on the one or more second locations.

13. A system comprising:

one or more non-transitory memories storing computer-executable instructions; and one or more hardware processors to execute the computer-executable instructions to:

determine first mesh data that represents a first geometric shape of a first object, the first mesh data comprising a first plurality of faces;

determine a first portion of the first plurality of faces that is occluded;

use a first function to determine one or more first values for a second portion of the first plurality of faces that does not include the first portion;

based at least in part on the one or more first values, generate second mesh data comprising a second plurality of faces that is spaced from the first plurality of faces by a first offset distance, wherein the second plurality of faces has a second count of faces that is less than a first count of faces of the first plurality of faces, and wherein a third portion of the second plurality of faces represents an inner surface of the first object and a fourth portion of the second plurality of faces represents an outer surface of the first object;

determine proxy data comprising a representation of a second geometric shape of a second object;

determine an alignment between the second geometric shape and a first subset of the third portion of the second plurality of faces;

determine a third geometric shape of the second object that conforms to a fifth portion of the representation of the second object to the first subset of the third portion of the second plurality of faces; and associate location data with the first mesh data based on one or more locations of the third geometric shape relative to one or more of the first mesh data or the second mesh data.

14. The system of claim 13, further comprising computer-executable instructions to:
use an ambient occlusion algorithm to determine ambient occlusion values for the first portion of the first plurality of faces; and
determine that the ambient occlusion values associated with the first portion of the first plurality of faces are greater than a threshold value indicative of occlusion of a face.

15. The system of claim 13, further comprising computer-executable instructions to:
at a first time, determine that generation of the second mesh data a first distance from the first plurality of faces does not intersect the first plurality of faces; and
at a second time after the first time, determine that generation of the second mesh data a second distance from the first plurality of faces intersects the first plurality of faces, wherein the second distance is less than the first distance;
wherein the first distance is used as the first offset distance in response to the generating the second mesh data at the second distance intersecting the first plurality of faces.

16. The system of claim 13, further comprising computer-executable instructions to:
use a second function to determine one or more second values based on the first portion of the first plurality of faces and the second portion of the first plurality of faces, wherein the second mesh data is further generated based on the one or more second values.

17. The system of claim 13, wherein the third geometric shape is determined at a first time, the system further comprising computer-executable instructions to:
at a second time after the first time, determine a fourth geometric shape of the first object by conforming a sixth portion of the second mesh data to the fifth portion of the representation of the second object.

18. The system of claim 17, further comprising computer-executable instructions to:
at a third time after the second time, determine a fifth geometric shape of the second object by conforming one or more of the fifth portion or a seventh portion of the second mesh data to the first subset of the third portion of the second plurality of faces.

19. The system of claim 17, further comprising computer-executable instructions to:
determine that the sixth portion of the second mesh data is closer to the fifth portion of the representation of the second object than a seventh portion of the second mesh data;
wherein the sixth portion of the second mesh data is conformed to the fifth portion in response to the sixth portion of the second mesh data being closer to the fifth portion.

20. The system of claim 13, further comprising computer-executable instructions to:
use an ambient occlusion algorithm to determine ambient occlusion values for the fourth portion of the second plurality of faces;
determine that the ambient occlusion values associated with the fourth portion are less than a threshold value indicative of non-occlusion of a face;
determine a second offset distance based on a characteristic of the first object; and
determine the third portion of the second plurality of faces that is spaced the second offset distance from the fourth portion of the second plurality of faces.

* * * * *